United States Patent
Smith et al.

(10) Patent No.: US 7,051,617 B2
(45) Date of Patent: May 30, 2006

(54) METHODS AND APPARATUS FOR TUNED AXIAL DAMPING IN ROTATING MACHINERY WITH FLOATING BEARING CARTRIDGE

(75) Inventors: Dennis W. Smith, Phoenix, AZ (US); Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/161,031

(22) Filed: Jun. 3, 2002

(65) Prior Publication Data

US 2005/0268735 A1    Dec. 8, 2005

(51) Int. Cl.
*F16F 15/16* (2006.01)
*F16C 27/00* (2006.01)

(52) U.S. Cl. ............... 74/573.13; 74/573.1; 74/5 R; 384/99

(58) Field of Classification Search .......... 74/572–574, 74/5 R; 384/99; 188/298, 280
See application file for complete search history.

(56) References Cited

U.S. PATENT DOCUMENTS

| | | | | | |
|---|---|---|---|---|---|
| 3,748,912 | A | * | 7/1973 | Hildebrand | 74/5 F |
| 3,762,429 | A | * | 10/1973 | Fitzgerald et al. | 137/92 |
| 3,765,480 | A | * | 10/1973 | Fries | 165/86 |
| 3,831,454 | A | * | 8/1974 | Hoffman | 73/504.03 |
| 3,897,985 | A | * | 8/1975 | Davis et al. | 308/176 |
| 3,980,358 | A | * | 9/1976 | Davis | 308/173 |
| 4,222,278 | A | * | 9/1980 | Nakamura | 74/5.5 |
| 4,258,577 | A | * | 3/1981 | Fox et al. | 74/5.6 R |
| 4,760,996 | A | * | 8/1988 | Davis | 267/122 |
| 4,764,033 | A | * | 8/1988 | Kohring et al. | 384/99 |
| 5,207,305 | A | * | 5/1993 | Iverson | 192/58.42 |
| 5,318,156 | A | * | 6/1994 | Davis | 188/298 |
| 5,332,070 | A | * | 7/1994 | Davis et al. | 188/298 |
| 5,419,212 | A | * | 5/1995 | Smith | 74/5.1 |
| 6,390,684 | B1 | * | 5/2002 | Bown | 384/535 |

FOREIGN PATENT DOCUMENTS

WO    WO 02/15366 A1 *  2/2002    ............... 74/572

OTHER PUBLICATIONS

Standard Handbook of Machine Design, Joseph E. Shigley and Charles R. Mischke, McGraw-Hill Book Company, 1986, pp. 25.1-25.9.*
Sperry Flight Systems—CMG's and Momentum Wheels, Revision 3, Apr. 1974—Section 2, p. 3; Section 11, p. 1; Section 16, p. 3; Section 17, p. 3; Section 18, p. 5, Section 19, p. 2.

* cited by examiner

*Primary Examiner*—Vinh T. Luong
(74) *Attorney, Agent, or Firm*—Kurt A. Luther

(57) ABSTRACT

An apparatus and method for selecting an appropriate viscous fluid for use in control moment gyroscopes, reaction wheels, momentum wheels and the like. Components such as the housing, the rotor, and the viscous fluid are modeled using a three-parameter isolator system, which allows optimization of the damping action for a given application.

3 Claims, 2 Drawing Sheets

METHODS AND APPARATUS FOR TUNED AXIAL DAMPING IN ROTATING MACHINERY WITH FLOATING BEARING CARTRIDGE

TECHNICAL FIELD

The present invention relates to combinations of fixed bearing and floating bearing assemblies and, more particularly, to gyroscopic spin bearings used in space vehicles and communication satellites.

BACKGROUND OF THE INVENTION

Satellites in orbit experience a number of factors such as aerodynamic drag that can cause undesirable changes in attitude. To maintain proper attitude, various mechanism such as control moment gyroscopes and reaction wheel assemblies are included in the satellite and are used to periodically adjust the attitude of the satellite. These systems also allow the vehicle to be rotated so as to point towards other objects in space. For example, a satellite containing a telescope could be rotated to point at a selected star or planet. These control systems are generally employed in circumstances where longevity and high accuracy over extended periods of time are of paramount importance. The performance of these devices is largely determined by the predictability of the behavior of the gyro rotor. This behavior, in turn, is influenced by the geometry, friction, compliances, torque, environmental considerations and the operating characteristics of the bearings that support the rotor.

Traditionally, gyro rotors are supported by ball bearings. The ball bearing art is well advanced and excellent results using ball bearings are obtainable. However, the various relatively unpredictable characteristics occasioned by the presence of balls, raceways, and the physical interaction between moving surfaces can have various undesired effects on the performance of the bearings which effects, at best, can be minimized but not eliminated.

One fairly common arrangement provides a rotor that is supported for rotation about its spin axis by a pair of oppositely disposed hubs that are each journaled in a pair of spin bearings. Typically, one of the bearing pairs may be a floating bearing assembly that includes a rotatable member or shaft coupled to the rotor shell and which is rotatable about a spin axis. The bearing assembly further incorporates a floating bearing cartridge which includes a pair of duplex bearings having inner and outer bearing races and a common outer sleeve assembly which serves to clamp the duplex bearing outer races under a predetermined preload. The outer surface of the bearing cartridge is permitted to translate along the spin axis under changes in ambient operating temperature or pressure differential.

The floating bearing cartridges are typically cylindrical and are contained in a cylindrical housing that provides clearance between the bearing cartridge and the cartridge sleeve assembly. This annulus is normally filled with a viscous fluid to promote heat transfer from the bearing cartridge and to also provide viscous shear damping for axial vibrations. These undesirable axial vibrations are typically caused by the axial motions generated by imperfections in the bearing and shaft geometries.

While various types of viscous fluids have been employed to increase the performance of the bearings with respect to reducing axial vibrations; pressure, temperature and other operating conditions associated with the environment of the gyroscope can negatively impact the performance of the viscous fluids used to damp axial vibrations. Additionally, the desire to significantly increase the rate of rotation for the gyro from the present rate of approximately 6,000 RPM has presented new performance considerations in certain applications. Specifically, as the rate of rotation for the rotor is increased to the range of 30,000–40,000 RPM, the radial and axial vibrations associated with the spinning rotor can be significantly magnified. When operating at a speed associated with a structural resonance, these rotor-generated forces can become significant enough to potentially cause structural damage.

These various factors have made it difficult to uniformly and predictably select a fluid with the appropriate viscosity to provide the desired results in the area of axial damping for control moment gyroscopes, reaction wheel assemblies, and the like. In fact, if the incorrect viscous fluid is chosen, it may actually provide viscous coupling between the rotor and the housing instead of viscous damping for these axial vibrations. Once again, this viscous coupling is very undesirable and may cause structural damage to the assembly.

In view of the foregoing, it should be appreciated that it would be desirable to provide methods for improving the selection of the viscous fluid used in the bearing annulus of control moment gyroscopes, reaction wheels, and momentum wheels, thereby enhancing the damping of the undesirable axial vibrations, specifically at high rates of rotation.

BRIEF SUMMARY OF THE INVENTION

According to the preferred exemplary embodiments of the present invention, there is provided an apparatus and method for selecting an appropriate viscous fluid for use in control moment gyroscopes, reaction wheels, momentum wheels and the like. By modeling components such as the housing, the rotor, and the viscous fluid using a three-parameter isolator system, the most effective damping action can be achieved for a given application.

BRIEF DESCRIPTION OF THE DRAWINGS

The present invention will hereinafter be described in conjunction with the appended drawing figures, wherein like numerals denote like elements, and.

DETAILED DESCRIPTION OF PREFERRED EXEMPLARY EMBODIMENTS

The following detailed description of a preferred embodiment is merely exemplary in nature and is not intended to limit the invention or the application and uses of the invention.

Figure 1:
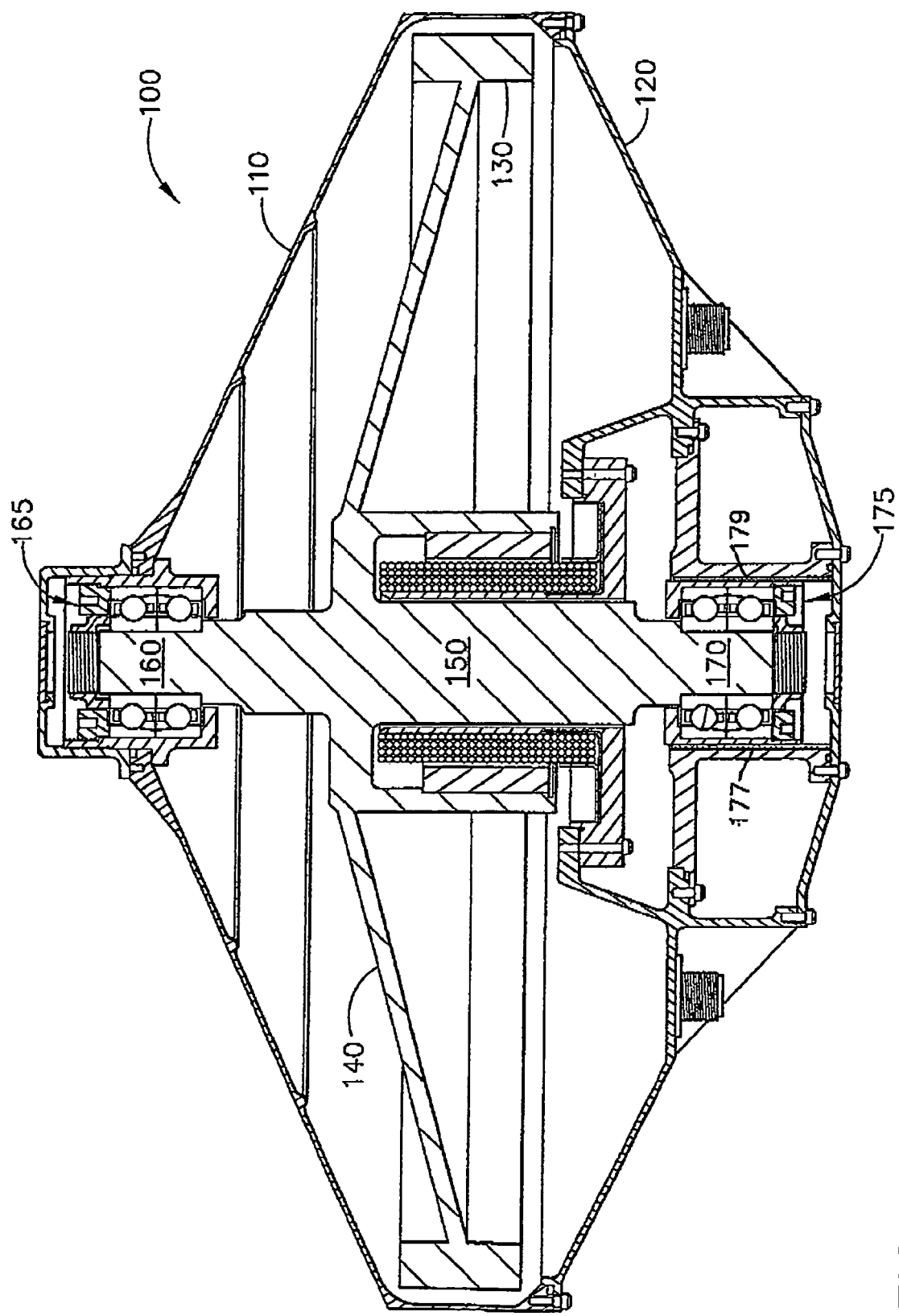
FIG. 1 is a sectional view of a Control Moment Gyroscope (CMG) Inner Gimbal Assembly (IGA) with a viscous fluid selected according to a preferred exemplary embodiment of the present invention.

Referring now to FIG. 1, an IGA 100 includes an upper housing assembly 110 and a lower housing assembly 120. Disposed within the upper and lower housing assemblies 110 and 120 is a large inertial element or rotor 130 which is supported through a suspension web 140 on a shaft 150 which has a first end 160 supported in a fixed bearing assembly 165 and a second end 170 supported in a floating bearing assembly 175.

As previously discussed, floating bearing assembly 175 is cylindrical in shape and is contained in the cylindrical housing that provides clearance between the bearing cartridge and the cartridge sleeve assembly. The annulus 177 for the IGA of FIG. 1 is filled with a viscous fluid 179 that has been selected in accordance with a preferred exemplary embodiment of the present invention. Other components of IGA 100 are depicted in FIG. 1 but are not specifically addressed relative to the description of the present invention.

The various components of IGA 100 have certain physical attributes that can be described as follows. Rotor 130 has a mass associated therewith which can be designated $M_R$. Upper housing assembly 110 has a plurality of structural members that combine to provide a total spring constant associated therewith which can be designated $K_{UH}$. Similarly, lower housing assembly 120 is comprised of a plurality of resilient sections and also has a total spring constant associated therewith, which can be designated $K_{LH}$. Finally, the combination of the annular space 177 formed between bearing cartridge 175 and the cartridge sleeve assembly, and the viscous fluid 179 contained therein have a damping effect which can be designated as $C_{IGA}$. Using the components of FIG. 1 in conjunction with the three-parameter isolator system model shown in FIG. 2, the methods of the present invention can be employed.

Figure 2:
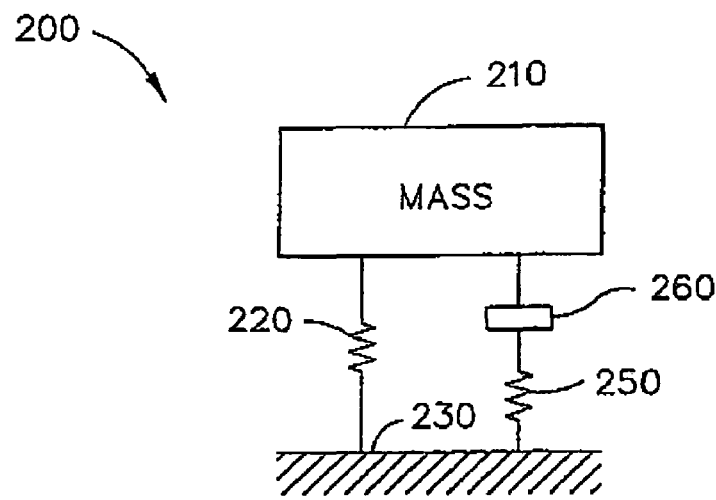
FIG. 2 is a mechanical schematic for a four-component spring mass damping system used to select fluid viscosity according to a preferred exemplary embodiment of the present invention.

Referring now to FIG. 2, a conventional model for a three-parameter isolator system 200 is shown. This type of system may be modeled with a first spring in parallel with a second spring that is in series with a damper. As shown in FIG. 2, isolator system 200 comprises: a mass 210; a first spring 220; a surface 230; a damping mechanism 260; and a second spring 250. First spring 220 has a spring constant associated therewith that can be designated $K_{220}$. Similarly, second spring 250 has a spring constant therewith that can be designated $K_{250}$. The mass associated with mass 210 can be designated $M_{210}$ and the damping effect of damping mechanism 260 can be designated as $C_{260}$.

As shown in FIG. 2, spring 220 is fixedly connected to both mass 210 and surface 230. Spring 250 is fixedly connected to both surface 230 and damping mechanism 260. Damping mechanism 260, in turn, is fixedly connected between spring 250 and mass 210. With this arrangement, damping mechanism 260 is in series with second spring 250 and first spring 220 is in parallel with the series combination of damping mechanism 260 and second spring 250. It is also important to note that, schematically, first spring 220 and second spring 250 are both connected to the same point, i.e., surface 230.

By appropriately selecting values for the various components of isolator system 200, that is, first spring 220, damping mechanism 260 and spring 250, isolator system 200 can be "tuned" to provide maximum damping at the fundamental frequency of operation and reduced damping at higher frequencies. This will allow the system to avoid the undesirable vibrations at the typical operating frequencies associated with mass 210.

Referring now to FIGS. 1 and 2, and with the concepts presented above in mind, a correlation can be made between the various components of FIGS. 1 and 2. By viewing upper housing assembly 110, lower housing assembly 120, and floating bearing assembly 175 of FIG. 1 as the components of a three-parameter isolator system as shown and described in FIG. 2, the viscosity of a fluid 179 for use in the annulus 177 containing floating bearing assembly 175 can be accurately and reliably calculated.

In the present case, upper housing 110 of FIG. 1 can be modeled as spring 220 of FIG. 2, lower housing 120 of FIG. 1 can be modeled as spring 250 of FIG. 2, rotor 130 of FIG. 1 can be modeled as mass 210 of FIG. 2, and floating bearing assembly 180 of FIG. 1 can be modeled as damper 260 of FIG. 2. Accordingly, $K_{220}$ is equivalent to $K_{UH}$, $K_{250}$ is equivalent to $K_{LH}$, $M_{210}$ is equivalent to $M_R$, and $C_{260}$ is equivalent to $C_{IGA}$.

Given that existing IGAs have been designed without the benefit of using the methods of the present invention, the only parameter of consequence that can be readily modified for existing IGAs is typically the damping effect associated with the viscosity of the fluid modeled in conjunction with damper 260. While this approach is somewhat limited in application, by selecting a fluid with the appropriate viscosity, substantial improvement in the performance of existing control moment gyroscopes, reaction wheel assemblies, and the like may be realized.

While not all previously constructed IGAs may not be able to benefit from the application of the methods of the present invention, newly designed control moment gyroscopes, reaction wheel assemblies, and the like can be constructed to take full advantage of the improved axial damping offered by the methodologies of the present invention. This is demonstrated in conjunction with the discussion of FIG. 3 below.

Figure 3:
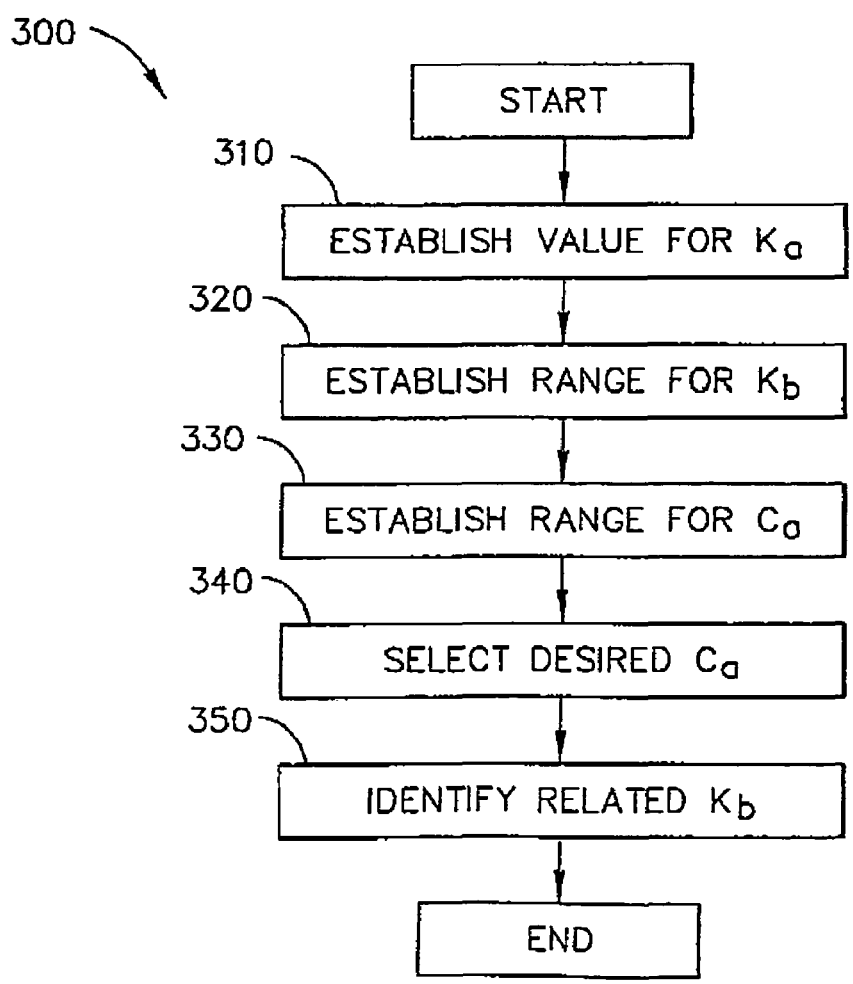
FIG. 3 is a flow chart for implementing a method for designing an IGA according to a preferred exemplary embodiment of the present invention.

Referring now to FIG. 3, a method 300 for designing an IGA in accordance with a preferred exemplary embodiment of the present invention is shown. First, a value for $K_a$ is established in conjunction with selecting a material and appropriate dimensions for the upper housing of the IGA (step 310). As previously explained, the material and dimensions selected for the upper housing will establish a certain spring constant $K_a$. Next, an appropriate range for $K_b$ can be established (step 320). This range is established by selecting the material and dimensions for the lower housing of the IGA, keeping in mind that the selected material and dimensions will be somewhat constrained by the practical realities of weight. However, there will be a number of possible material and dimensional choices and each combination will have a spring constant value $K_b$ associated with it. The exact value for $K_b$ can be selected after completing the other steps in the process.

Next, the appropriate range for $C_a$ can be established (step 330). This is accomplished by using the $K_a$ value identified in step 310 and the range for $K_b$ identified in step 320, using the formula shown below, where $f_o$ is the target operating frequency for the device.

$$C_a = K_b/(2\pi f_o)(1+K_b/K_a)^{0.5}$$

Given the range for $C_a$, the possible choices for achieving the desired $C_a$ can be narrowed, based on the range of sizes for the annulus 177 and the viscosity associated with the various fluids 179 that may be used to fill the annulusn 177. By varying the size of the annulus and the type of fluid 179 placed in the annulus177, a wide variety of values for $C_a$ can be established. The most desirable $C_a$ will be based on the practical design restrictions associated with the possible size of the annulus 177 and the availability of various suitable viscous fluids 179 to place into the annulus 177. By evaluating the range of possibilities presented by these options, the most advantageous $C_a$ can be selected from the range (step 340). Once the desired $C_a$ has been selected, then the $K_b$ that is related to that $C_a$ can be identified from the range of possible values for $K_b$ (step 350) and the lower housing design associated with that value of $K_b$ can be utilized in fabricating the lower housing of the IGA. Refinements in the selection of $K_a$ may also be made in a like manner, if required by practical realities associated with the available ranges of $K_b$ and $C_a$.

It will be apparent to those skilled in the art that the methods of the present invention are applicable to other high-speed rotating mechanical systems that use duplex floating bearings such as turbo-vacuum pumps and the like. The salient points are recognizing which components of the target system are equivalent to the components of the spring damping system shown in FIG. 2, modeling the components of the target system, and choosing the viscosity of the damping fluid accordingly. By implementing the methodology of the present invention, axial damping can be achieved as well as providing for reduction in physical wear on the bearings housed within both fixed and floating bearing cartridges.

From the foregoing detailed description of the preferred exemplary embodiments, it should be appreciated that these preferred exemplary embodiments for various aspects of the present invention are only examples, and are not intended to limit the scope, applicability, or configuration of the invention in any way. Rather, the detailed description provided herein will provide those skilled in the art with a convenient road map for implementing a preferred embodiment of the invention. It should be understood that various changes may be made in the function and arrangement of elements described in an exemplary preferred embodiment without departing from the spirit and scope of the invention as set forth in the appended claims.

What is claimed is:

1. An inner gimbal assembly comprising:
   an upper housing, said upper housing defining a first spring constant;
   a lower housing connected to said upper housing, said lower housing defining a second spring constant, said upper housing and said lower housing defining an interior space;
   a shaft contained within said interior space, said shaft having a first end and a second end, said first end being mounted to said upper housing and said second end being mounted to said lower housing, said shaft and said lower housing defining an annulus, said annulus defining a volume;
   a rotating member affixed to said shaft, said rotating member defining a mass; a floating bearing cartridge coaxially positioned within said annulus; said floating bearing cartridge moving axially within said annulus; and
   a viscous fluid filling said annuls and surrounding said floating bearing cartridge, said viscous fluid providing a damping effect for said axial displacements of said floating bearing cartridge in response to a plurality of external vibrations, said viscous fluid being selected by a mathematical equation considering said first spring constant and said second spring constant and mass and said volume;
   wherein said mathematical formula is defined as $C^a = K_b/(2\pi f_o)(1+K_b/K_a)^{0.5}$.

2. The inner gimbal assembly of claim 1 wherein said first spring constant is associated with a first material composition and said second spring constant is associated with a second material composition.

3. A gyroscopic apparatus comprising:
   a housing;
   a rotor contained within said housing;
   a shaft contained within said housing;
   said rotor being supported on said shalt, said shaft having a first end journaled in a fixed spin bearing and said shaft having a second end jounaled in a floating spin bearing, said second end and said floating spin bearing being contained within a bearing housing, said bearing housing further defining an annulus;
   a viscous fluid substantially filling said annulus, said viscous fluid comprising a viscosity, said viscous fluid providing viscous shear damping for a plurality of axial movements of said floating bearing; and
   wherein a value for said viscosity is mathematically derived by relating said housing and said annuhis and said rotor and said viscous fluid to a three-parameter isolator system. and
   wherein said value for said viscosity is mathematically derived using a mathematical formula defined as $C_a = K_b/(2\pi f\sigma)(1+K_b/K_a)_{0.5}$.

\* \* \* \* \*

UNITED STATES PATENT AND TRADEMARK OFFICE
CERTIFICATE OF CORRECTION

| | |
|---|---|
| PATENT NO. | : 7,051,617 B2 |
| APPLICATION NO. | : 10/161031 |
| DATED | : May 30, 2006 |
| INVENTOR(S) | : Dennis W. Smith et al. |

It is certified that error appears in the above-identified patent and that said Letters Patent is hereby corrected as shown below:

Column 6, line 12, add the word --said-- in front of the word "mass";
Column 6, lines 15 and 16, the mathematical formula should appear as follows:

$$--C_a = K_b / (2\pi f_o)(1+K_b/K_a)^{.5}--;$$

Column 6, line 26, "shalt" should be changed to --shaft--;
Column 6, line 37, "annuhis" should be changed to --annulus--.

Signed and Sealed this

Twenty-seventh Day of March, 2007

JON W. DUDAS
*Director of the United States Patent and Trademark Office*